(12) United States Patent  
Sampsell

(10) Patent No.: US 7,766,498 B2
(45) Date of Patent: Aug. 3, 2010

(54) LINEAR SOLID STATE ILLUMINATOR

(75) Inventor: Jeffrey B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 240 days.

(21) Appl. No.: 11/472,879

(22) Filed: Jun. 21, 2006

(65) Prior Publication Data

US 2007/0297191 A1 Dec. 27, 2007

(51) Int. Cl.
G09F 13/04 (2006.01)

(52) U.S. Cl. ............... 362/97.3; 362/84; 362/97.1; 362/555; 362/612; 362/615; 349/62; 349/64; 349/112

(58) Field of Classification Search .......... 349/62, 349/65, 68, 159, 64, 112; 362/551, 555, 362/612, 600, 94, 97.1, 559, 606–609, 611, 362/615, 618; 964/62, 65, 68, 159
See application file for complete search history.

(56) References Cited

U.S. PATENT DOCUMENTS

| | | | |
|---|---|---|---|
| 3,439,973 A | 4/1969 | Paul et al. |
| 3,886,310 A | 5/1975 | Guldberg |
| 3,924,929 A | 12/1975 | Holmen |
| 4,375,312 A | 3/1983 | Tangonan |
| 4,378,567 A | 3/1983 | Mir |
| 4,421,381 A | 12/1983 | Ueda |
| 4,441,791 A | 4/1984 | Hornbeck |
| 4,850,682 A | 7/1989 | Gerritsen |
| 4,974,942 A | 12/1990 | Gross |
| 5,050,946 A | 9/1991 | Hathaway |
| 5,142,414 A | 8/1992 | Koehler |
| 5,291,314 A | 3/1994 | Agranat |
| 5,339,179 A | 8/1994 | Rudisill |
| 5,452,385 A | 9/1995 | Izumi |
| 5,467,417 A | 11/1995 | Nakamura |
| 5,515,184 A | 5/1996 | Caulfield |
| 5,550,373 A | 8/1996 | Cole |
| 5,555,160 A | 9/1996 | Tawara |
| 5,579,149 A | 11/1996 | Moret |

(Continued)

FOREIGN PATENT DOCUMENTS

CN 1381752 11/2002

(Continued)

OTHER PUBLICATIONS

Giles et al., "Silicon MEMS Optical Switch Attenuator and Its Use in Lightwave Subsystems", IEEE Journal of Selected Topics in Quanum Electronics, vol. 5. No. 1, Jan./Feb. 1999,pp. 18-25.

(Continued)

*Primary Examiner*—Sandra L O'Shea
*Assistant Examiner*—Mary Zettl
(74) *Attorney, Agent, or Firm*—Knobbe, Martens, Olson & Bear LLP

(57) ABSTRACT

An illuminator for a display is provided that includes a light guide plate to substantially cover a viewable portion of the display, and a thin film light-emitting source. Light from the thin film light-emitting source is directed into an edge of the light guide plate to provide light for the viewable portion of the display.

43 Claims, 11 Drawing Sheets

U.S. PATENT DOCUMENTS

| | | | |
|---|---|---|---|
| 5,592,332 A | 1/1997 | Nishio | |
| 5,594,830 A | 1/1997 | Winston | |
| 5,650,865 A | 7/1997 | Smith | |
| 5,659,410 A | 8/1997 | Koike | |
| 5,671,994 A | 9/1997 | Tai | |
| 5,673,128 A * | 9/1997 | Ohta et al. | 349/62 |
| 5,703,667 A | 12/1997 | Ochiai | |
| 5,735,590 A | 4/1998 | Kashima | |
| 5,771,321 A | 6/1998 | Shapiro et al. | |
| 5,783,614 A | 7/1998 | Chen | |
| 5,810,464 A | 9/1998 | Ishikawa | |
| 5,854,872 A | 12/1998 | Tai | |
| 5,883,684 A | 3/1999 | Millikan et al. | |
| 5,892,598 A | 4/1999 | Asakawa et al. | |
| 5,913,594 A | 6/1999 | Iimura | |
| 5,920,417 A | 7/1999 | Johnson | |
| 5,956,106 A | 9/1999 | Petersen | |
| 5,982,540 A | 11/1999 | Koike | |
| 6,014,192 A | 1/2000 | Lehureau | |
| 6,040,937 A | 3/2000 | Miles | |
| 6,048,071 A | 4/2000 | Sawayama | |
| 6,055,090 A | 4/2000 | Miles | |
| 6,073,034 A | 6/2000 | Jacobsen | |
| 6,074,069 A | 6/2000 | Chau-Ching et al. | |
| 6,091,469 A | 7/2000 | Naito | |
| 6,099,134 A | 8/2000 | Taniguchi | |
| 6,128,077 A | 10/2000 | Jovin | |
| 6,151,089 A | 11/2000 | Yang et al. | |
| 6,195,196 B1 | 2/2001 | Kimura | |
| 6,196,691 B1 | 3/2001 | Ochiai | |
| 6,199,989 B1 | 3/2001 | Maeda et al. | |
| 6,232,937 B1 | 5/2001 | Jacobsen | |
| 6,273,577 B1 | 8/2001 | Goto | |
| 6,292,504 B1 | 9/2001 | Halmos | |
| 6,371,623 B1 | 4/2002 | Toyoda | |
| 6,377,233 B2 | 4/2002 | Colgan | |
| 6,407,785 B1 | 6/2002 | Yamazaki | |
| 6,412,969 B1 | 7/2002 | Torihara | |
| 6,454,452 B1 | 9/2002 | Sasagawa | |
| 6,456,279 B1 | 9/2002 | Kubo | |
| 6,478,432 B1 | 11/2002 | Dyner | |
| 6,504,589 B1 | 1/2003 | Kashima | |
| 6,512,626 B1 | 1/2003 | Schmidt | |
| 6,519,073 B1 | 2/2003 | Goossen | |
| 6,522,794 B1 | 2/2003 | Bischel et al. | |
| 6,582,095 B1 | 6/2003 | Toyoda | |
| 6,592,234 B2 | 7/2003 | Epstein et al. | |
| 6,597,490 B2 | 7/2003 | Tayebati | |
| 6,598,987 B1 | 7/2003 | Parikka | |
| 6,603,520 B2 | 8/2003 | Umemoto | |
| 6,631,998 B2 | 10/2003 | Egawa et al. | |
| 6,636,358 B2 | 10/2003 | Umemoto et al. | |
| 6,642,913 B1 | 11/2003 | Chuang et al. | |
| 6,650,455 B2 | 11/2003 | Miles | |
| 6,652,109 B2 | 11/2003 | Nakamura | |
| 6,657,683 B2 | 12/2003 | Richard | |
| 6,660,997 B2 | 12/2003 | Laberge | |
| 6,669,350 B2 | 12/2003 | Yamashita | |
| 6,674,562 B1 | 1/2004 | Miles | |
| 6,680,792 B2 | 1/2004 | Miles | |
| 6,683,693 B1 | 1/2004 | Otsuka et al. | |
| 6,693,690 B2 | 2/2004 | Umemoto | |
| 6,709,123 B2 | 3/2004 | Flohr | |
| 6,741,377 B2 | 5/2004 | Miles | |
| 6,742,907 B2 * | 6/2004 | Funamoto et al. | 362/625 |
| 6,742,921 B2 | 6/2004 | Umemoto | |
| 6,751,023 B2 | 6/2004 | Umemoto et al. | |
| 6,761,461 B2 | 7/2004 | Mizutani et al. | |
| 6,773,126 B1 | 8/2004 | Hatjasalo et al. | |
| 6,778,746 B2 | 8/2004 | Charlton | |
| 6,792,293 B1 | 9/2004 | Awan et al. | |
| 6,794,119 B2 | 9/2004 | Miles | |
| 6,819,380 B2 | 11/2004 | Wen | |
| 6,829,258 B1 | 12/2004 | Carlisle | |
| 6,844,953 B2 | 1/2005 | Reboa | |
| 6,853,418 B2 | 2/2005 | Suzuki et al. | |
| 6,862,141 B2 | 3/2005 | Olczak | |
| 6,865,312 B2 | 3/2005 | Niv et al. | |
| 6,879,354 B1 | 4/2005 | Sawayama | |
| 6,880,959 B2 | 4/2005 | Houston | |
| 6,882,461 B1 | 4/2005 | Tsai | |
| 6,897,855 B1 * | 5/2005 | Matthies et al. | 345/204 |
| 6,930,816 B2 | 8/2005 | Mochizuki | |
| 6,951,401 B2 | 10/2005 | Van Hees et al. | |
| 6,961,045 B2 | 11/2005 | Tsao | |
| 6,964,484 B2 | 11/2005 | Gupta | |
| 7,018,088 B2 | 3/2006 | Yu | |
| 7,025,461 B2 | 4/2006 | Veligdan | |
| 7,042,643 B2 | 5/2006 | Miles | |
| 7,054,045 B2 | 5/2006 | McPheters | |
| 7,061,226 B2 | 6/2006 | Durr | |
| 7,072,093 B2 | 7/2006 | Piehl | |
| 7,072,096 B2 | 7/2006 | Holman et al. | |
| 7,110,158 B2 | 9/2006 | Miles | |
| 7,123,216 B1 | 10/2006 | Miles | |
| 7,142,347 B2 | 11/2006 | Islam | |
| 7,156,546 B2 | 1/2007 | Higashiyama | |
| 7,161,136 B1 | 1/2007 | Wenstrand | |
| 7,180,672 B2 | 2/2007 | Olczak | |
| 7,187,489 B2 | 3/2007 | Miles | |
| 7,206,133 B2 | 4/2007 | Cassarly | |
| 7,212,345 B2 | 5/2007 | Wilson | |
| 7,218,812 B2 | 5/2007 | Maxwell | |
| 7,262,754 B1 | 8/2007 | Yamazaki | |
| 7,262,916 B2 | 8/2007 | Kao | |
| 7,324,284 B2 | 1/2008 | Olczak | |
| 7,342,705 B2 | 3/2008 | Chui | |
| 7,349,139 B2 | 3/2008 | Chui | |
| 7,349,141 B2 | 3/2008 | Tung | |
| 7,352,501 B2 | 4/2008 | Chopra et al. | |
| 7,355,780 B2 | 4/2008 | Chui | |
| 7,357,552 B2 | 4/2008 | Takada | |
| 7,357,557 B2 | 4/2008 | Miyashita | |
| 7,359,011 B2 | 4/2008 | Hamada | |
| 7,366,393 B2 | 4/2008 | Cassarly | |
| 7,380,969 B2 | 6/2008 | Yamashita | |
| 7,380,970 B2 | 6/2008 | Hwang | |
| 7,389,476 B2 | 6/2008 | Senda et al. | |
| 7,417,784 B2 | 8/2008 | Sasagawa | |
| 7,450,295 B2 | 11/2008 | Tung | |
| 7,515,336 B2 | 4/2009 | Lippey | |
| 7,532,800 B2 | 5/2009 | Iimura | |
| 7,545,569 B2 | 6/2009 | Cassarly | |
| 7,561,323 B2 | 7/2009 | Gally | |
| 7,603,001 B2 | 10/2009 | Wang | |
| 2001/0010630 A1 | 8/2001 | Umemoto | |
| 2001/0019380 A1 | 9/2001 | Ishihara | |
| 2001/0019479 A1 | 9/2001 | Nakabayashi | |
| 2001/0022636 A1 | 9/2001 | Yang et al. | |
| 2001/0030861 A1 | 10/2001 | Oda | |
| 2001/0055208 A1 | 12/2001 | Kimura | |
| 2002/0006036 A1 | 1/2002 | Egawa | |
| 2002/0024711 A1 * | 2/2002 | Miles | 359/247 |
| 2002/0034071 A1 | 3/2002 | Mabuchi | |
| 2002/0044445 A1 | 4/2002 | Bohler | |
| 2002/0051354 A1 | 5/2002 | Egawa | |
| 2002/0054258 A1 | 5/2002 | Kondo | |
| 2002/0106182 A1 | 8/2002 | Kawashima | |
| 2002/0135560 A1 | 9/2002 | Akaoka | |
| 2002/0149584 A1 | 10/2002 | Simpson | |
| 2002/0154256 A1 | 10/2002 | Gotoh | |
| 2002/0167730 A1 | 11/2002 | Needham | |
| 2002/0172039 A1 | 11/2002 | Inditsky | |
| 2003/0012009 A1 | 1/2003 | Suzuki | |

| | | |
|---|---|---|
| 2003/0016930 A1 | 1/2003 | Inditsky |
| 2003/0030764 A1 | 2/2003 | Lee |
| 2003/0067760 A1 | 4/2003 | Jagt |
| 2003/0071947 A1 | 4/2003 | Shiraogawa |
| 2003/0083429 A1 | 5/2003 | Smith |
| 2003/0086031 A1 | 5/2003 | Taniguchi |
| 2003/0090887 A1 | 5/2003 | Igarashi |
| 2003/0095401 A1 | 5/2003 | Hanson |
| 2003/0098957 A1 | 5/2003 | Haldiman |
| 2003/0099118 A1 | 5/2003 | Saitoh |
| 2003/0103177 A1 | 6/2003 | Maeda |
| 2003/0103344 A1 | 6/2003 | Niida |
| 2003/0123245 A1 | 7/2003 | Parker |
| 2003/0160919 A1 | 8/2003 | Yutaka et al. |
| 2003/0169385 A1 | 9/2003 | Okuwaki |
| 2003/0193630 A1 | 10/2003 | Chiou |
| 2003/0210222 A1 | 11/2003 | Ogiwara et al. |
| 2003/0210367 A1 | 11/2003 | Nakano |
| 2003/0214728 A1 | 11/2003 | Olczak |
| 2004/0001169 A1 | 1/2004 | Saiki |
| 2004/0017599 A1 | 1/2004 | Yang |
| 2004/0027315 A1 | 2/2004 | Senda et al. |
| 2004/0032401 A1 | 2/2004 | Nakazawa |
| 2004/0042233 A1 | 3/2004 | Suzuki |
| 2004/0051929 A1 | 3/2004 | Sampsell |
| 2004/0070711 A1 | 4/2004 | Wen et al. |
| 2004/0080938 A1 | 4/2004 | Holman |
| 2004/0085748 A1 | 5/2004 | Sugiura |
| 2004/0100796 A1* | 5/2004 | Ward .................. 362/231 |
| 2004/0109305 A1 | 6/2004 | Chisholm |
| 2004/0170373 A1 | 9/2004 | Kim |
| 2004/0207995 A1 | 10/2004 | Park |
| 2004/0218390 A1 | 11/2004 | Holman et al. |
| 2004/0228112 A1 | 11/2004 | Takata |
| 2004/0246743 A1 | 12/2004 | Lee |
| 2005/0002082 A1 | 1/2005 | Miles |
| 2005/0024849 A1 | 2/2005 | Parker |
| 2005/0041175 A1 | 2/2005 | Akiyama |
| 2005/0046011 A1 | 3/2005 | Chen |
| 2005/0069254 A1 | 3/2005 | Schultheis |
| 2005/0120553 A1 | 6/2005 | Brown |
| 2005/0133761 A1 | 6/2005 | Thielemans |
| 2005/0141065 A1 | 6/2005 | Masamoto |
| 2005/0146897 A1 | 7/2005 | Mimura |
| 2005/0195175 A1 | 9/2005 | Anderson |
| 2005/0195370 A1 | 9/2005 | Gore |
| 2005/0195468 A1 | 9/2005 | Sampsell |
| 2005/0231977 A1 | 10/2005 | Hayakawa |
| 2005/0248524 A1* | 11/2005 | Feng et al. .................. 345/102 |
| 2005/0259939 A1 | 11/2005 | Rinko |
| 2005/0271325 A1 | 12/2005 | Anderson |
| 2005/0286113 A1 | 12/2005 | Miles |
| 2006/0001942 A1 | 1/2006 | Chui |
| 2006/0002141 A1 | 1/2006 | Ouderkirk |
| 2006/0024017 A1 | 2/2006 | Page |
| 2006/0050032 A1* | 3/2006 | Gunner et al. .................. 345/82 |
| 2006/0051048 A1 | 3/2006 | Gardiner |
| 2006/0061705 A1 | 3/2006 | Onishi |
| 2006/0062016 A1* | 3/2006 | Dejima et al. .................. 362/600 |
| 2006/0066541 A1 | 3/2006 | Gally |
| 2006/0066586 A1 | 3/2006 | Gally |
| 2006/0066783 A1 | 3/2006 | Sampsell |
| 2006/0066935 A1 | 3/2006 | Cummings et al. |
| 2006/0067651 A1 | 3/2006 | Chui |
| 2006/0072315 A1 | 4/2006 | Han et al. |
| 2006/0072339 A1 | 4/2006 | Li et al. |
| 2006/0077123 A1 | 4/2006 | Gally |
| 2006/0077154 A1 | 4/2006 | Gally |
| 2006/0083028 A1 | 4/2006 | Sun et al. |
| 2006/0110090 A1 | 5/2006 | Ellwood |
| 2006/0126142 A1 | 6/2006 | Choi |
| 2006/0132383 A1 | 6/2006 | Gally |
| 2006/0164861 A1 | 7/2006 | Maeda |
| 2006/0181866 A1 | 8/2006 | Jung |
| 2006/0181903 A1 | 8/2006 | Okuwaki |
| 2006/0187676 A1 | 8/2006 | Ishikura |
| 2006/0198013 A1 | 9/2006 | Sampsell |
| 2006/0209012 A1 | 9/2006 | Hagood |
| 2006/0209385 A1 | 9/2006 | Liu |
| 2006/0215958 A1 | 9/2006 | Yeo |
| 2006/0265919 A1 | 11/2006 | Huang |
| 2006/0268574 A1 | 11/2006 | Jung |
| 2006/0274400 A1 | 12/2006 | Miles |
| 2006/0285356 A1 | 12/2006 | Tseng |
| 2007/0081360 A1 | 4/2007 | Bailey |
| 2007/0116424 A1 | 5/2007 | Ting |
| 2007/0147087 A1 | 6/2007 | Parker |
| 2007/0189036 A1 | 8/2007 | Chen |
| 2007/0196040 A1 | 8/2007 | Wang |
| 2007/0201234 A1 | 8/2007 | Ottermann |
| 2007/0210163 A1 | 9/2007 | Han |
| 2007/0241340 A1 | 10/2007 | Pan |
| 2007/0268695 A1 | 11/2007 | Seetzen |
| 2007/0279727 A1 | 12/2007 | Gandhi |
| 2007/0292091 A1 | 12/2007 | Fujii |
| 2008/0049445 A1 | 2/2008 | Harbers |
| 2008/0049450 A1 | 2/2008 | Sampsell |
| 2008/0084600 A1 | 4/2008 | Bita et al. |
| 2008/0084602 A1 | 4/2008 | Xu |
| 2008/0090025 A1 | 4/2008 | Freking |
| 2008/0094853 A1 | 4/2008 | Kim |
| 2008/0100900 A1 | 5/2008 | Chui |
| 2008/0180777 A1 | 7/2008 | Tung |
| 2008/0180956 A1 | 7/2008 | Gruhlke |
| 2008/0232135 A1 | 9/2008 | Kinder |
| 2008/0267572 A1 | 10/2008 | Sampsell |
| 2009/0050454 A1 | 2/2009 | Matsukawa |
| 2009/0097100 A1 | 4/2009 | Gally |
| 2009/0126792 A1 | 5/2009 | Gruhlke |
| 2009/0147332 A1 | 6/2009 | Bita et al. |
| 2009/0147535 A1 | 6/2009 | Mienko |
| 2009/0168459 A1 | 7/2009 | Holman |
| 2009/0190373 A1 | 7/2009 | Bita et al. |
| 2009/0201301 A1 | 8/2009 | Mienko |
| 2009/0201565 A1 | 8/2009 | Bita et al. |
| 2009/0201571 A1 | 8/2009 | Gally |
| 2009/0225394 A1 | 9/2009 | Chui |
| 2009/0231877 A1 | 9/2009 | Mienko |
| 2009/0251752 A1 | 10/2009 | Gruhlke |
| 2009/0296193 A1 | 12/2009 | Bita et al. |
| 2009/0296194 A1 | 12/2009 | Gally |

FOREIGN PATENT DOCUMENTS

| | | |
|---|---|---|
| DE | 199 42 513 | 3/2001 |
| EP | 0 278 038 | 8/1988 |
| EP | 0 590 511 | 4/1994 |
| EP | 0 822 441 | 2/1998 |
| EP | 0 879 991 | 11/1998 |
| EP | 0 907 050 | 4/1999 |
| EP | 0 957 392 | 11/1999 |
| EP | 0 984 314 | 3/2000 |
| EP | 1 089 115 | 4/2001 |
| EP | 1 127 984 | 8/2001 |
| EP | 1 143 270 | 10/2001 |
| EP | 1 199 512 | 4/2002 |
| EP | 1 251 454 | 4/2002 |
| EP | 1 271 223 | 6/2002 |
| EP | 1 296 094 | 3/2003 |
| EP | 1 306 609 | 5/2003 |
| EP | 1 329 664 | 7/2003 |
| EP | 1 336 876 | 8/2003 |
| EP | 1 341 025 | 9/2003 |
| EP | 1 347 315 | 9/2003 |
| EP | 1 389 775 | 2/2004 |
| EP | 1 413 543 | 4/2004 |

| | | |
|---|---|---|
| EP | 1 437 610 | 7/2004 |
| EP | 1 445 629 | 8/2004 |
| EP | 1 450 418 | 8/2004 |
| EP | 1 519 218 | 3/2005 |
| EP | 1 531 302 | 5/2005 |
| EP | 1 544 537 | 6/2005 |
| EP | 1 577 701 | 9/2005 |
| EP | 1 698 918 | 9/2006 |
| EP | 1 734 401 | 12/2006 |
| EP | 1 748 305 | 1/2007 |
| GB | 2 260 203 | 4/1993 |
| GB | 2321532 | 7/1998 |
| GB | 2 331 615 | 5/1999 |
| GB | 2 340 281 | 2/2000 |
| GB | 2 351 834 | 1/2001 |
| JP | 60 242408 | 12/1985 |
| JP | 09 160032 | 6/1997 |
| JP | 09 311333 | 12/1997 |
| JP | 11 231321 | 8/1999 |
| JP | 11 232919 | 8/1999 |
| JP | 2000 075293 | 3/2000 |
| JP | 2000 081848 | 3/2000 |
| JP | 2000 181367 | 6/2000 |
| JP | 2000 193933 | 7/2000 |
| JP | 2001-021883 | 1/2001 |
| JP | 2002 090549 | 3/2002 |
| JP | 2002-108227 | 4/2002 |
| JP | 2002 196151 | 7/2002 |
| JP | 2002 523798 | 7/2002 |
| JP | 2002 245835 | 8/2002 |
| JP | 2003 007114 | 1/2003 |
| JP | 2003 057652 | 2/2003 |
| JP | 2003 131215 | 5/2003 |
| JP | 2003 173713 | 6/2003 |
| JP | 2003-188959 | 7/2003 |
| JP | 2003-315694 | 11/2003 |
| JP | 2003 344881 | 12/2003 |
| JP | 2005-259365 | 9/2005 |
| JP | 2006 107993 | 4/2006 |
| JP | 2006 120571 | 5/2006 |
| WO | WO 95/01584 | 1/1995 |
| WO | WO 97/01240 | 1/1997 |
| WO | WO 98/19201 | 5/1998 |
| WO | WO 98/32047 | 7/1998 |
| WO | WO 98/35182 | 8/1998 |
| WO | WO 99/63394 | 12/1999 |
| WO | WO 00/11502 | 3/2000 |
| WO | WO 00/50807 | 8/2000 |
| WO | WO 01/29148 | 4/2001 |
| WO | WO 01/57434 | 8/2001 |
| WO | WO 01/84228 | 11/2001 |
| WO | WO 01/84229 | 11/2001 |
| WO | WO 02/06858 | 1/2002 |
| WO | WO 02/071132 | 9/2002 |
| WO | WO 02/097324 | 12/2002 |
| WO | WO 03/007049 | 1/2003 |
| WO | WO 03/038509 | 5/2003 |
| WO | WO 03/056876 | 7/2003 |
| WO | WO 03/062912 | 7/2003 |
| WO | WO 03/105198 | 12/2003 |
| WO | WO 2004/003643 | 1/2004 |
| WO | WO 2004/006003 | 1/2004 |
| WO | WO 2004/015489 | 2/2004 |
| WO | WO 2004/088372 | 10/2004 |
| WO | WO 2004/114418 | 12/2004 |
| WO | WO 2005/011012 | 2/2005 |
| WO | WO 2005/088367 | 9/2005 |
| WO | WO 2005/111669 | 11/2005 |
| WO | WO 2006/008702 | 1/2006 |
| WO | WO 2007/064133 | 6/2007 |
| WO | WO 2007/094558 | 8/2007 |
| WO | WO 2008/145096 | 12/2008 |

OTHER PUBLICATIONS

Magel, "Integrated Optic Devices Using Micromachined Metal Membranes", SPIE vol. 2686, 0-8194-2060-Mar. 1996.
Mehregany et al., "MEMS Applications in Optical Systems", IEEE/LEOS 1996 Summer Topical Meetings, pp. 75-76, (Aug. 5-9, 1996).
Tai, C.Y. et al., "A Transparent Front Lighting System for Reflective-type Displays," 1995 SID International Symposium Digest of Technical Papers, Orlando, May 23-25, 1995, SID International Symposium Digest of Technical Papers, Santa Ana, SID, US vol. 26, May 23, 1995. pp. 375-378.
Zhou et al., "Waveguide Panel Display Using Electromechanism Spatial Modulators" SID Digest, vol. XXIX, 1998.
ISR and WO in PCT/US2007/014385 mailed on Dec. 13, 2007.
Miles, et al., Digital Paper for reflective displays, Journal of the Society for Information Display, San Jose, CA, vol. 11, No. 1, 2003, pp. 209-215.
Miles, Interferometric Modulation: MOEMS as an enabling technology for high-performance reflective displays, Proceedings of the SPIE, 4985:28, pp. 131-139, Jan. 2003.
International Preliminary Report on Patentability in PCT/US2007/014358 dated Jul. 31, 2008.
Official Communication in European Application No. 07796287 (Publication No. 1943550) dated Oct. 14, 2008.
Fan et al., "Channel Drop Filters in Photonic Crystals", Optics Express, vol. 3, No. 1, pp. 4-11, 1998.
Giles et al., " Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Little et al., "Vertically Coupled Microring Rosonator Channel Dropping Filter", IEEE Photonics Technology Letters, vol. 11, No. 2, pp. 215-217, 1999.
Magel, "Integrated Optic Devices Using Micromachined Metal Membranes", SPIE vol. 2686, 0-8194-2060-3, pp. 54-63, 1996.
Neal T.D., et. al., "Surface Plasmon enhanced emission from dye doped polymer layers," Optics Express Opt. Soc. America, USA, vol. 13, No. 14, pp. 5522-5527, Jul. 11, 2005.
Oliner, "Radiating Elements and Mutual Coupling," Microwave Scanning Antennas, vol. 2, pp. 131-157 and pp. 190-194, 1966.
US 7,619,822, 11/2009, Gruhlke (withdrawn)

\* cited by examiner

LINEAR SOLID STATE ILLUMINATOR

FIELD OF THE INVENTION

The present invention relates generally to display devices, and more particularly to an illuminator for display devices.

BACKGROUND OF THE INVENTION

Non-emissive display devices (referred to herein as "display devices") (e.g., STN LCD, iMoD, or TFT LCD) typically include a front lighting or a back lighting system to increase visibility and display quality of images (e.g., text, line art, graphical images, and the like) shown on the display devices. FIGS. 1A-1D illustrate components of a conventional front lighting system 100 for a reflective display device. Referring first to FIGS. 1A-1B, the front lighting system 100 includes a light emitting diode (LED) 102, an angle-matching component 104, and an (injection molded) light bar 106. The LED 102 is placed at one end of the light bar 106 to direct light into the light bar 106, and the angle-matching component 104 is placed between the LED 102 and the light bar 106 to maximize the amount of light captured by the light bar 106. The light directed in to the light bar 106 is generally confined within the light bar through total internal reflection (TIR) at the air/light bar interface surrounding the light bar 106. The light bar 106 typically includes a plurality of facets 108 (or features) molded into a face of the light bar that disrupts the total internal reflection of the light. The facets 108 are typically precisely designed and spaced to ensure that light exits from the light bar 106 in a uniform fashion along the length of the light bar.

Referring to FIGS. 1C-1D, the front lighting system 100 further includes a reflector 110 and a light guide plate 112. The light guide plate 112 is bonded to the light bar 106 and substantially covers a viewable portion of a display device 114. The reflector 110 directs the light exiting from the light bar 106 towards the light guide plate 112, which light is then, once again, generally totally internally reflected within the light guide plate 112. The light guide plate 112 typically includes a plurality of facets (not shown) that are molded onto the surface 116 of the light guide plate 112. These facets disrupt the total internal reflection of the light within the light guide plate 112 and direct light uniformly onto the display device 114.

In high volume manufacturing of display devices, the cumulative costs associated with the individual components of a conventional front lighting system can be substantial. Accordingly, what is needed is a front lighting system that includes fewer components than conventional front lighting systems. The present invention addresses such a need.

BRIEF SUMMARY OF THE INVENTION

In general, in one aspect, this specification describes an illuminator for a display that includes a light guide plate to substantially cover a viewable portion of the display, and a thin film light-emitting source. Light from the thin film light-emitting source is directed into an edge of the light guide plate to provide light for the viewable portion of the display.

Particular implementations can include one or more of the following features. The thin film light-emitting source can be bonded directly to the edge of the light guide plate. The thin film light-emitting source can comprise an organic light-emitting diode (OLED) or an electroluminescent (EL) thin film light source. The organic light-emitting diode (OLED) can consist of a single pixel. A first dimension of the pixel can be substantially equal to a thickness of the light guide plate and a second dimension of the pixel can be substantially equal to a length of the edge of the light guide plate. The pixel can comprise a white pixel that is, e.g., created by a plurality of separate wavelength emissions that are matched to a plurality of specific reflectivities of subpixels that make up each pixel of a color display. The pixel can comprise a pixel having emissions substantially centered around a specific wavelength matched to a specific reflectivity of a monochrome display. The pixel can have emissions that substantially peak around two specific wavelengths that are matched to a reflectivity of a bichrome display.

The illuminator can further include an angle-matching component to direct the light from the organic light-emitting diode (OLED) into the edge of the light guide plate. At least a portion of the angle-matching component can have a substantially parabolic or elliptical shape for collimating the light from the organic light-emitting diode (OLED) into the edge of the light guide plate. The angle-matching component can be molded directly into the light guide plate. The organic light-emitting diode (OLED) can be bonded directly to the surface of the light guide plate. The light guide plate can comprise a plurality of facets molded into the surface of the light guide plate so that the light from the thin film light-emitting source exits from the light guide plate in a substantially uniform fashion over the viewable portion of the display. A thickness of the light guide plate can be tapered along one edge of the light guide plate. The illuminator can be implemented within a front lighting system or a back lighting system of a display.

In general, in another aspect, this specification describes a display device comprising the illuminator, discussed above. The display device can comprise an interferometric modulator display. The display device can further include a processor that is in electrical communication with the interferometric modulator display and a memory device in electrical communication with the processor. The processor can be configured to process image data. The display device can further include a first controller configured to send at least one signal to the interferometric modulator display, and a second controller configured to send at least a portion of the image data to the first controller. The display device can further include an image source module configured to send the image data to the processor. The image source module can comprise at least one of a receiver, transceiver, and transmitter. The display device can further include an input device configured to receive input data and to communicate the input data to the processor.

In general, in another aspect, this specification describes an illuminator for a display comprising a light guide means for substantially covering a viewable portion of the display; and thin film means for emitting light, in which light from the thin film light-emitting means is directed into an edge of the light guide means for providing light to the viewable portion of the display.

In general, in another aspect, this specification describes a method of manufacturing an illuminator for a display. The method includes providing a light guide plate, in which the light guide plate substantially covers a viewable portion of the display. The method further includes coupling a thin film light-emitting source to the light guide plate, in which light from the thin film light-emitting source is directed into an edge of the light guide plate to provide light to the viewable portion of the display.

Implementations may provide one or more of the following advantages. An improved front lighting system for a display device that includes a reduced number of components relative to conventional front lighting systems. In one implementation, a front lighting system is provided that consists of as few as two components unlike a conventional front lighting system that typically consists of five or six components. In one implementation, a front lighting system is described that includes an organic light-emitting diode (OLED) as a light source. A thin film light-emitting source (e.g., an organic light-emitting diode (OLED)) typically costs the same as a conventional LED and, therefore, a substantial costs saving can be realized in high volume manufacturing of display devices that include a front lighting system such as those described herein. A light source including an organic light-emitting diode (OLED) can be fabricated through manufacturing methods more akin to polymer manufacturing traditions than to semiconductor manufacturing traditions.

The details of one or more implementations are set forth in the accompanying drawings and the description below. Other features and advantages will be apparent from the description and drawings, and from the claims.

DETAILED DESCRIPTION OF THE INVENTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments of a front lighting system described herein may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). Micro-electromechanical systems (MEMS) devices of similar structure to those described herein can also be used in non-display applications such as in electronic switching devices.

As discussed above, reflective display devices typically implement a front lighting system that provides light for viewing images, for example, in the dark. Conventional front lighting systems, however, include a number of components, the costs of which can be substantial with respect to high volume manufacturing of display devices. Accordingly, this specification describes an improved front lighting system for a display device that includes a reduced number of components relative to conventional front lighting systems. In one embodiment, an illuminator for a display is provided that includes a light guide plate to substantially cover a viewable portion of the display, and a thin film light-emitting source. Light from the thin film light-emitting source is directed into an edge of the light guide plate to provide light for the viewable portion of the display.

Figure 1A:
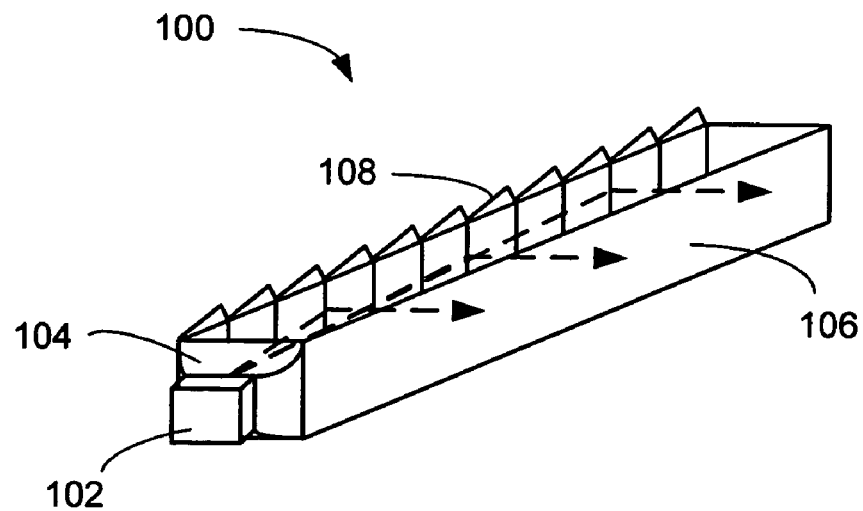
FIGS. 1A-1D illustrate a conventional front lighting system for a display.
Figure 1B:
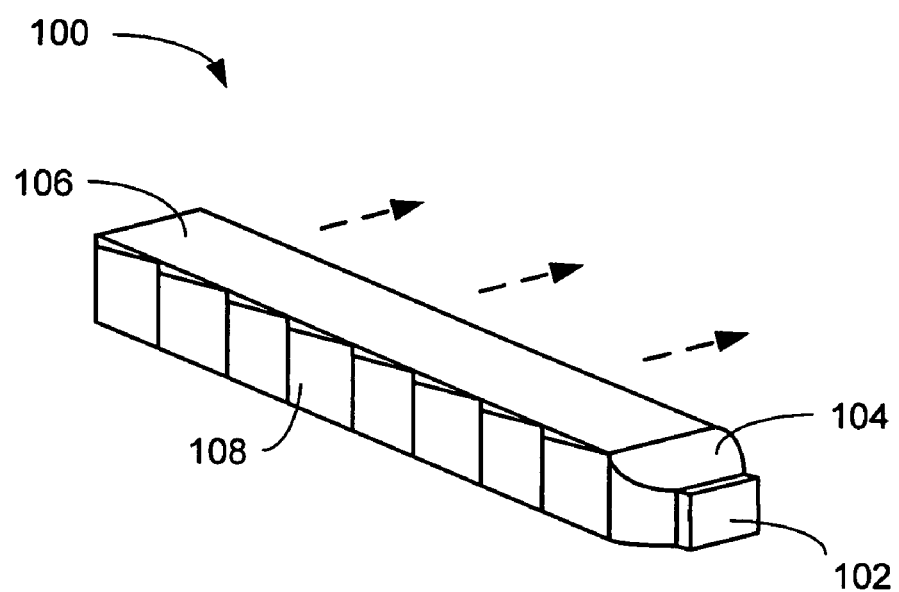
Figure 1C:
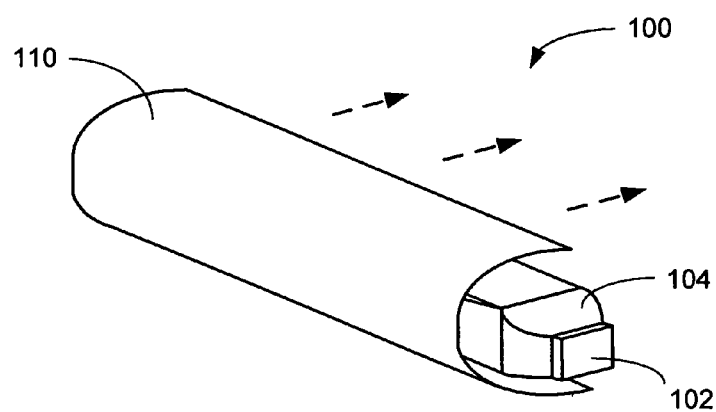
Figure 1D:
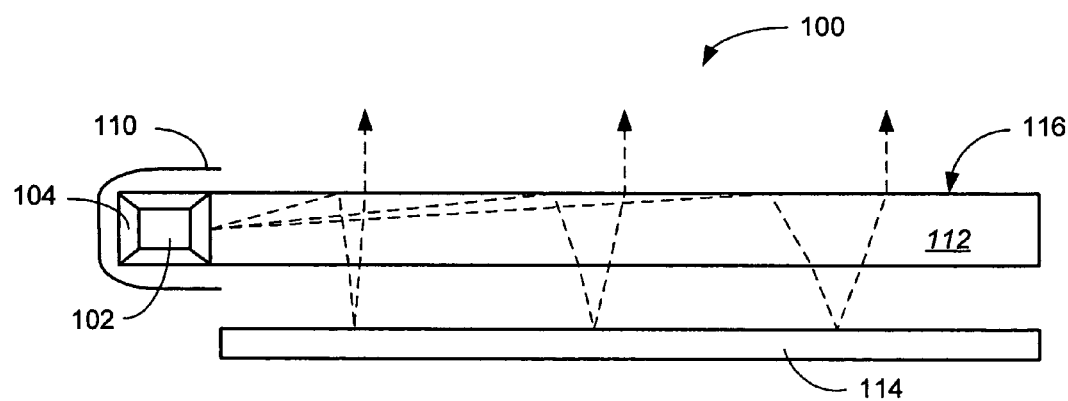
Figure 2A:
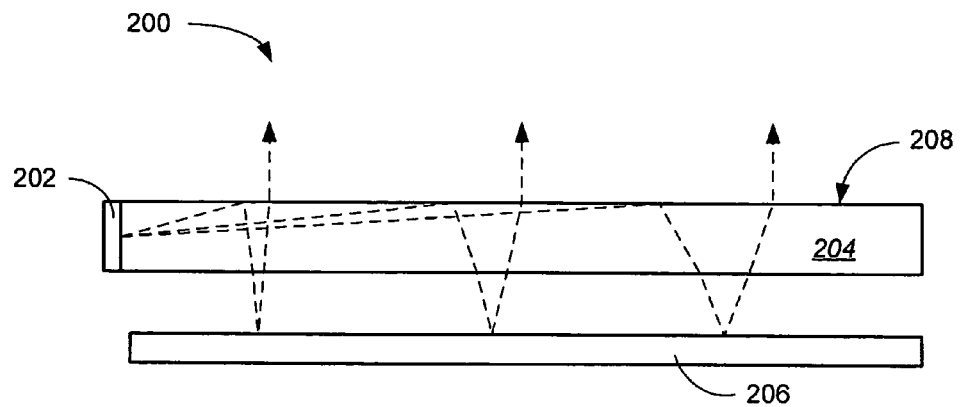
FIGS. 2A-2B illustrate a front lighting system.
Figure 2B:
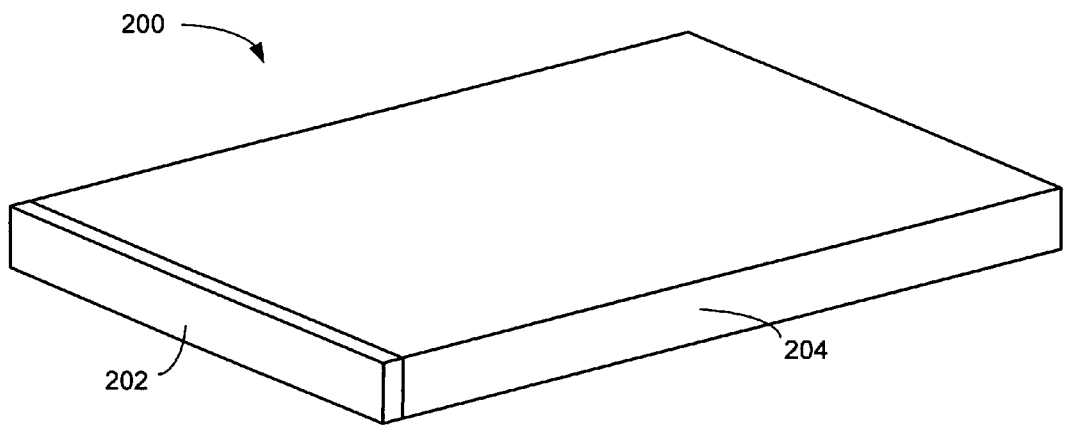

FIGS. 2A-2B respectively illustrate a side view and a perspective view of a front lighting system 200 in accordance with one embodiment. The front lighting system 200 includes a light source 202 and a light guide plate 204. In one embodiment, the light source 202 is bonded directly to an edge of the light guide plate 204. In one embodiment, the front lighting system further includes a reflector (not shown) to direct light exiting from the light source 202 towards the light guide plate 204. The light guide plate 204 is configured to substantially cover a viewable portion of a display device (e.g., display device 206), and provide light for the viewable portion of the display device. In one embodiment, the light source 202 comprises a thin film light-emitting source. The thin film light-emitting source can be an organic light-emitting diode (OLED) in which the emissive layer is an organic compound. In general, the thin film light-emitting source can be any type of thin film light-emitting source operable to produce light, such as for example, both small and large molecule OLEDs or fluorescent OLEDs. Alternatively, an electroluminescent (EL) thin film light source can be used. In one embodiment, the EL material is enclosed between two electrodes, in which at least one electrode is transparent to allow the escape of the produced light. Glass coated with indium oxide or indium tin oxide (ITO) is commonly used as the front (transparent) electrode while the back electrode is or is coated with reflective metal.

In one embodiment, the thin film light-emitting source (e.g., an organic light-emitting diode (OLED)) consists of a single pixel having one dimension that is substantially the same as the thickness of the light guide plate 204 and one dimension that is substantially the same as the length of one edge of the light guide plate 204. The pixel can be a white pixel (or any other color—e.g., a pixel having emissions centered around a specific wavelength matched to the specific reflectivity of a monochrome display). In one implementation, the pixel has emissions that substantially peaks around two specific wavelengths that are matched to a reflectivity of a bichrome display. The white pixel can be created by three (or more) separate wavelength emissions that are matched to three (or more) specific reflectivities of the three (or more) subpixels that (in one implementation) make up each pixel of a color display. Also, a white light can be made of two complementary colors, e.g., blue and yellow. In operation, light from the light source 202 is directed into an edge of the light guide plate 204. In one embodiment, the light guide plate 204 includes a plurality of facets (not shown) that are molded onto the surface 208 of the light guide plate 204. The facets direct light uniformly onto the display device 206.

Accordingly, in one embodiment, the front lighting system 200 consists of as few as two components unlike a conventional front lighting system that typically consists of five or six components. A thin film light-emitting source (e.g., an organic light-emitting diode (OLED)) typically costs the same as a conventional LED and, therefore, a substantial costs saving can be realized in high volume manufacturing of display devices that include a front lighting system such as those described herein.

Figure 3:
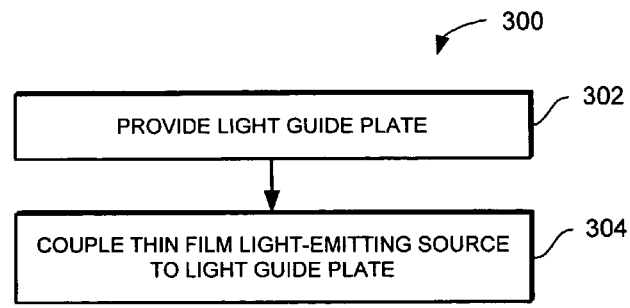
FIG. 3 is a flowchart of a process for implementing a front lighting system.

FIG. 3 illustrates a process 300 of implementing a front lighting system (e.g., front lighting system 200) in accordance with one embodiment. The process 300 begins with providing a light guide plate (e.g., light guide plate 204) (step 302). In general, the light guide plate is an optical waveguide through which light can travel. In one embodiment, the light guide plate includes a plurality of facets (or features) that uniformly direct light towards a display device (e.g., a liquid crystal display (LCD)) to provide light for the display device. A thin film light-emitting source is coupled to the light guide plate (step 304). In one embodiment, the thin film light-emitting source is bonded directly to an edge of the light guide plate. In another embodiment, the thin film light-emitting source is bonded directly to the surface of the light guide plate (as discussed in greater detail below with respect to FIG. 7). As discussed above, the thin film light-emitting source can be any type of thin film light-emitting source operable to produce light. In one embodiment, the thin film light-emitting source is an organic light-emitting diode (OLED). Alternatively, the thin film light-emitting source can be an electroluminescent (EL) thin film light source.

Figure 4:
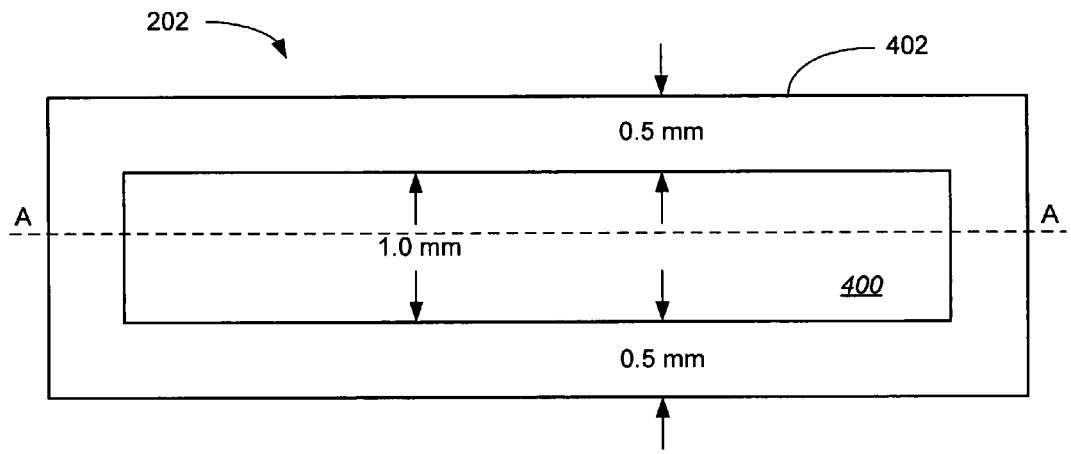
FIG. 4 illustrates an organic light emitting diode (OLED).

FIG. 4 illustrates the light source 202 (FIG. 2A) according to one embodiment. In one embodiment, the light source 202 is composed of an organic light-emitting diode (OLED) 400 encapsulated by a seal ring 402. The seal ring 402 can be formed of an adhesive, epoxy, glue, or other suitable material. In the embodiment shown, the seal ring 402 has a width of approximately 0.5 mm, and the organic light-emitting diode (OLED) 400 is formed within the center of the seal ring 402 having a width of substantially 1.0 mm. The seal ring 402 can have a length that is substantially equivalent to a length of an edge of a light guide plate. The seal ring 402 seals the organic light-emitting diode (OLED) 400 between two substrates as shown below with respect to FIG. 5. In one embodiment, the seal ring 402 hermetically seals the organic light-emitting diode (OLED) 400 between the two substrates.

Figure 5:
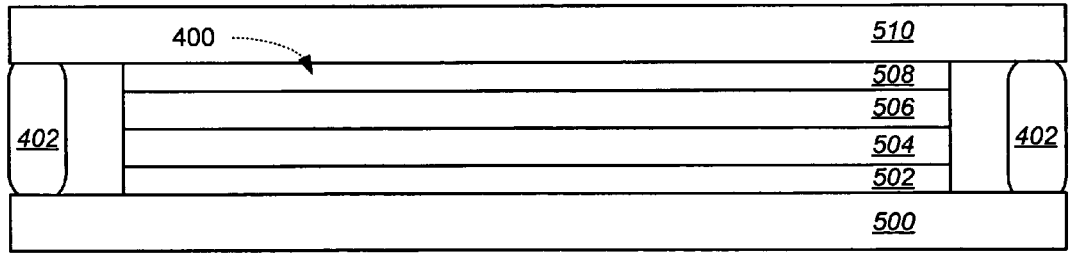
FIG. 5 illustrates a cross section of the organic light emitting diode (OLED) of FIG. 4.

FIG. 5 illustrates a cross-sectional view of the light source 202 along the line A-A of FIG. 4 according to one embodiment. As shown in FIG. 5, the organic light-emitting diode (OLED) 400 includes a (front) substrate 500, an anode 502, an organic conductive layer 504 (commonly referred to as a "hole injection layer" or "HIL"), an organic emissive layer 506, a cathode 508 and a (back) substrate 510. The front substrate 500 can be, for example, plastic, glass, or other suitable transparent material. The back substrate 510 can be, e.g., glass, plastic, or even a non-transparent material such as metal or foil. The anode 502 removes electrons (i.e., adds electron "holes") when a current flows through the organic light-emitting diode (OLED). The conductive layer 504 is made of organic plastic molecules that transport "holes" from the anode 502. In one embodiment, a conducting polymer used within the conductive layer 504 is polyaniline. The organic emissive layer 506 is made of organic plastic molecules (different from those within the conducting layer) that transport electrons from the cathode 508. Light is made in the organic emissive layer 506. In one embodiment, a polymer used within the organic emissive layer 506 is polyfluorene. Other suitable materials can be used. The front substrate 500 is adhesively bonded to the back substrate 510 by the seal ring 402. In one embodiment, the front substrate 500 is adhesively bonded to an edge of a light guide plate as discussed in greater detail below.

Figure 6:
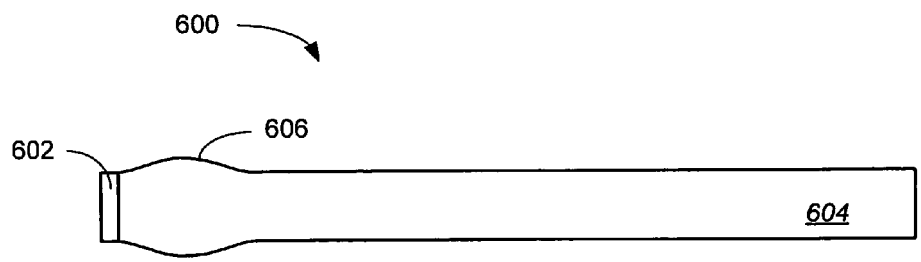
FIGS. 6-8 respectively illustrate a front lighting system.
Figure 7:
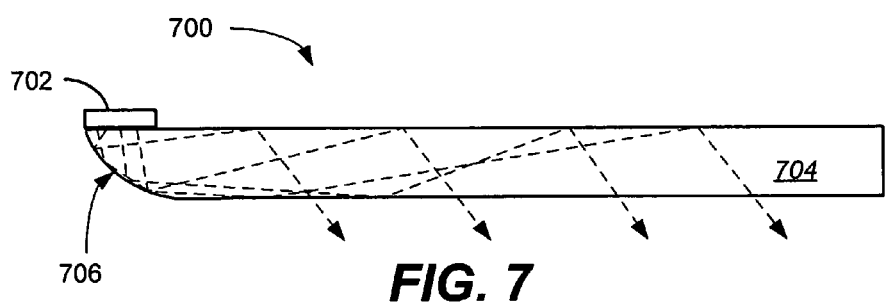
Figure 8:
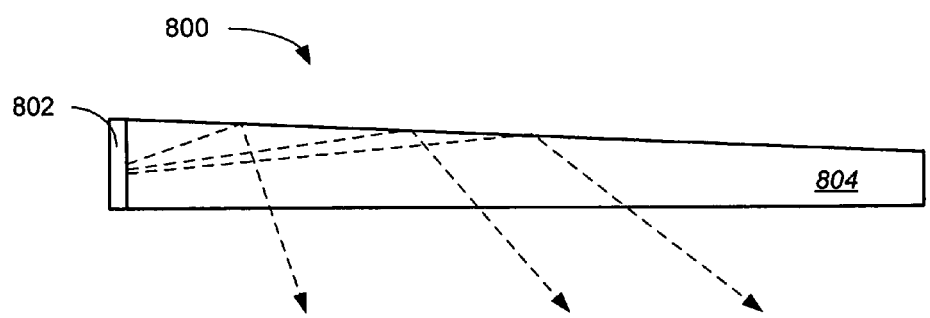

FIGS. 6-8 respectively illustrate various embodiments of a front lighting system. Referring first to FIG. 6, a front lighting system 600 is shown including a light source 602, a light guide plate 604, and an angle-matching component 606. In one embodiment, the light source 602 is bonded to an edge of a light guide plate 604, and the angle-matching component 606 is a feature of the light guide plate 604—i.e., the angle-matching component 606 is molded directly into the light guide plate 604. Alternatively, the angle-matching component 606 can be separate from the light guide plate 604. In one embodiment, the angle-matching component has a substantially parabolic (or elliptical) shape for collimating the light from the light source 602 (e.g., an organic light-emitting diode (OLED)) into the edge of the light guide plate 604. Referring to FIG. 7, a front lighting system 700 is shown including a light source 702 bonded to a surface of a light guide plate 704. In this embodiment, the light guide plate 704 includes a reflector 706 to direct light from the light source 702 throughout the light guide plate 704. In one embodiment, the reflector 706 is a compound parabolic collector (CPC) or a sub-portion of a CPC. FIG. 8 illustrates a front lighting system 800 including a light source 802 and a tapered light guide plate 804 for uniformly directing light onto a display device (not shown). In the embodiment of FIG. 8, the tapered light guide plate 804 has a tapered thickness along a length of the light guide plate. The tapered light guide plate 804 can further include a plurality of facets molded onto a surface (or a film laminate applied to the surface) for directing light onto a display device. Although FIGS. 6-8 show separate embodiments of a front light system, one or more of the features of the various embodiments discussed with respect to FIG. 6-8 can be combined into a single embodiment of a front light system.

As discussed above, the various embodiments of a front lighting system described herein may be implemented in any device that is configured to display an image, whether in motion (e.g., video) or stationary (e.g., still image), and whether textual or pictorial. One particular type of display device—an interferometric modulator display—that can implement the various embodiments of a front lighting system will now be discussed.

Figure 9:
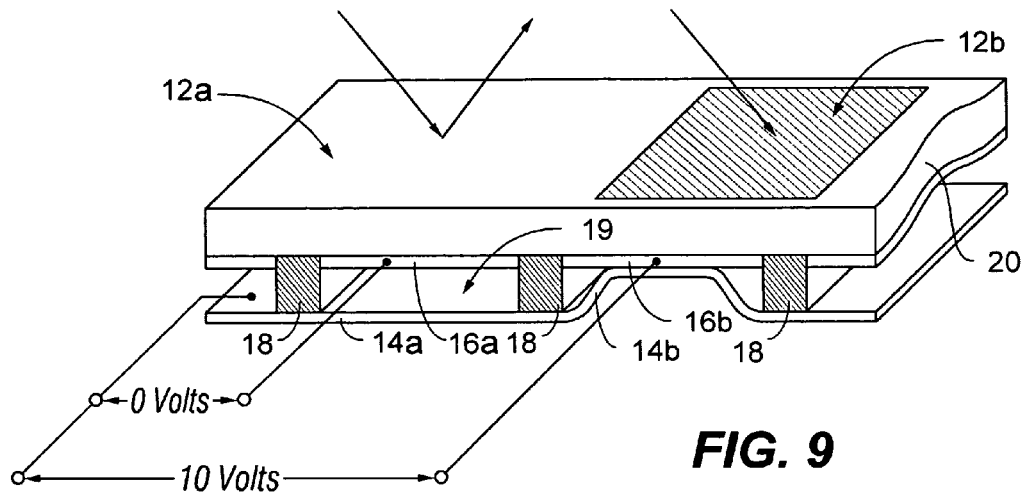
FIG. 9 is an isometric view depicting a portion of one embodiment of an interferometric modulator display that can incorporate a front lighting system in accordance with one implementation of the present invention.

Referring to FIG. 9, one interferometric modulator display embodiment comprising an interferometric MEMS display element is illustrated. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 9 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 9 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials. In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 9. The behavior is the same regardless of the polarity of the applied potential difference. In this way, row/column actuation that can control the reflective vs. non-reflective pixel states is analogous in many ways to that used in conventional LCD and other display technologies.

FIGS. 10-12 and 13A-13B illustrate one exemplary process and system for using an array of interferometric modulators in a display application.

Figure 10:
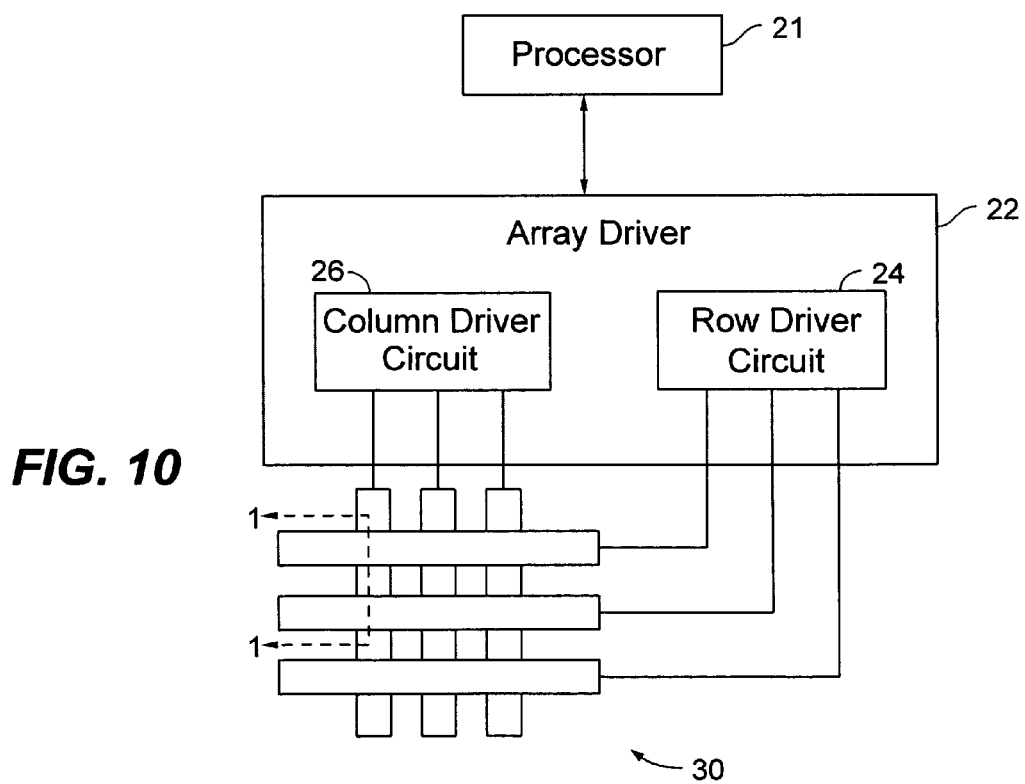
FIG. 10 is a system block diagram illustrating one embodiment of an electronic device incorporating a 3×3 interferometric modulator display.

FIG. 10 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 9 is shown by the lines 1-1 in FIG. 10. For MEMS interferometric modulators, the row/column actuation protocol may take advantage of a hysteresis property of these devices illustrated in FIG. 11. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 11, the movable layer does not relax completely until the voltage drops below 2 volts. There is thus a range of voltage, about 3 to 7 V in the example illustrated in FIG. 11, where there exists a window of applied voltage within which the device is stable in either the relaxed or actuated state. This is referred to herein as the "hysteresis window" or "stability window." For a display array having the hysteresis characteristics of FIG. 11, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 9 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used.

Figures 11, 12:
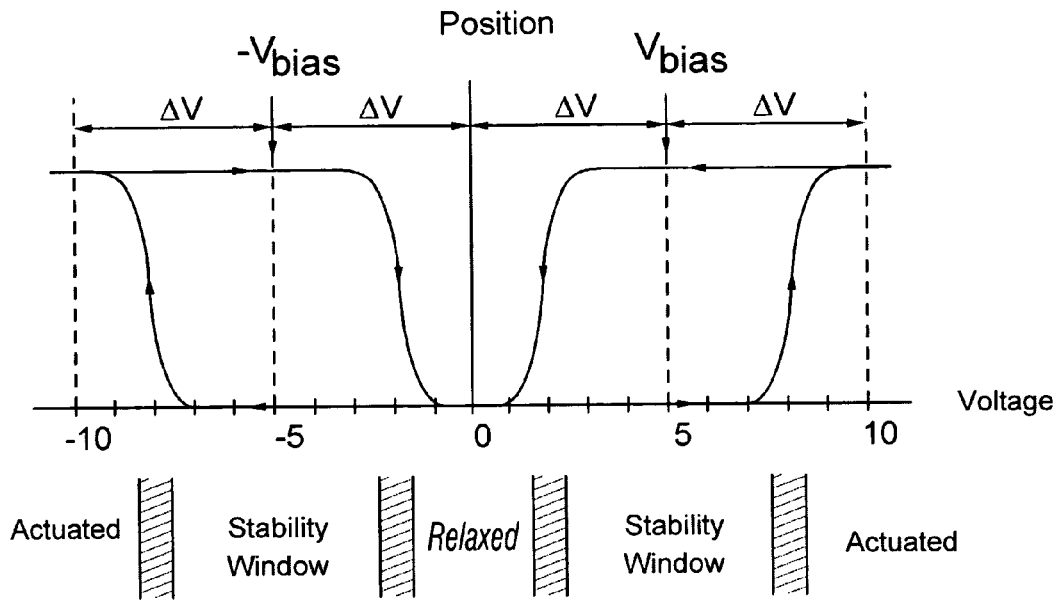
FIG. 11 is a diagram of movable mirror position versus applied voltage for one exemplary embodiment of an interferometric modulator of FIG. 9.
FIG. 12 is an illustration of a set of row and column voltages that may be used to drive an interferometric modulator display.
Figure 13A:
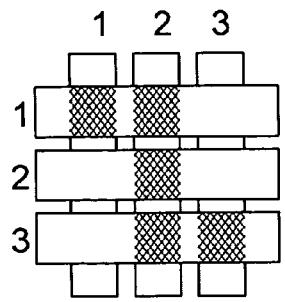
FIGS. 13A-13B illustrate one exemplary timing diagram for row and column signals that may be used to write a frame of display data to the 3×3 interferometric modulator display of FIG. 10.
Figure 13B:
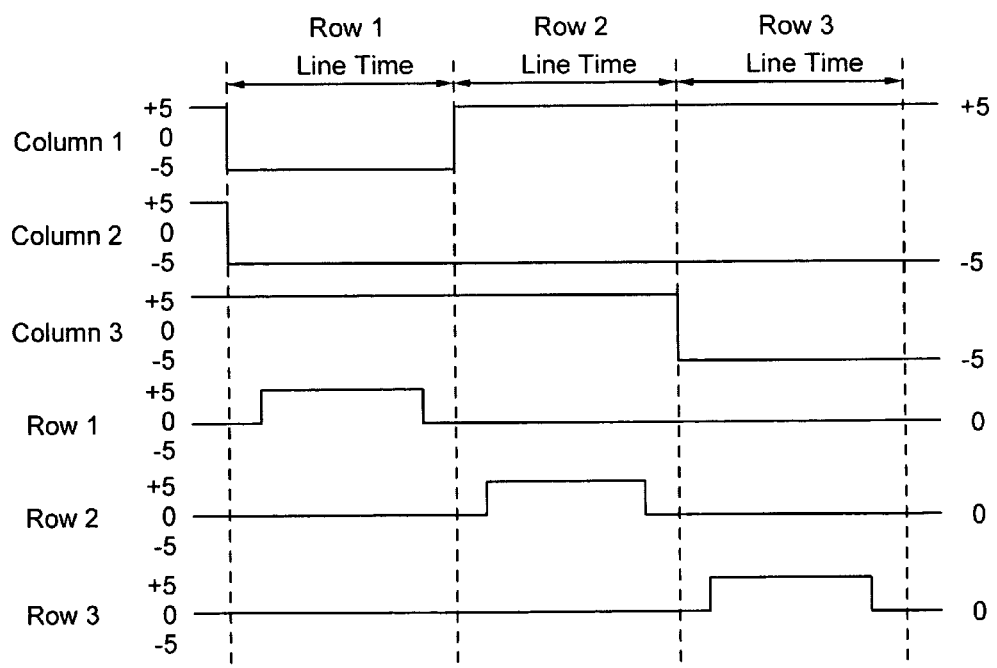

FIGS. 12 and 13A-13B illustrate one possible actuation protocol for creating a display frame on the 3×3 array of FIG. 10. FIG. 12 illustrates a possible set of column and row voltage levels that may be used for pixels exhibiting the hysteresis curves of FIG. 11. In the embodiment shown in FIG. 12, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 12, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 13B is a timing diagram showing a series of row and column signals applied to the 3×3 array of FIG. 10 which will result in the display arrangement illustrated in FIG. 13A, where actuated pixels are non-reflective. Prior to writing the frame illustrated in FIG. 13A, the pixels can be in any state, and in this example, all the rows are at 0 volts, and all the columns are at +5 volts. With these applied voltages, all pixels are stable in their existing actuated or relaxed states.

In the FIG. 13A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 13A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 14A:
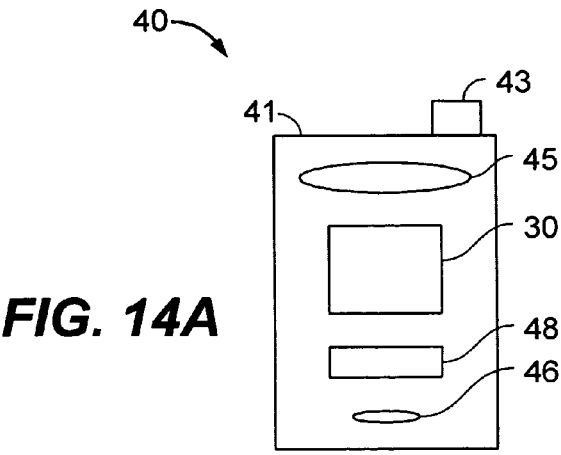
FIGS. 14A-14B are system block diagrams illustrating an embodiment of a visual display device comprising a plurality of interferometric modulators.
Figure 14B:
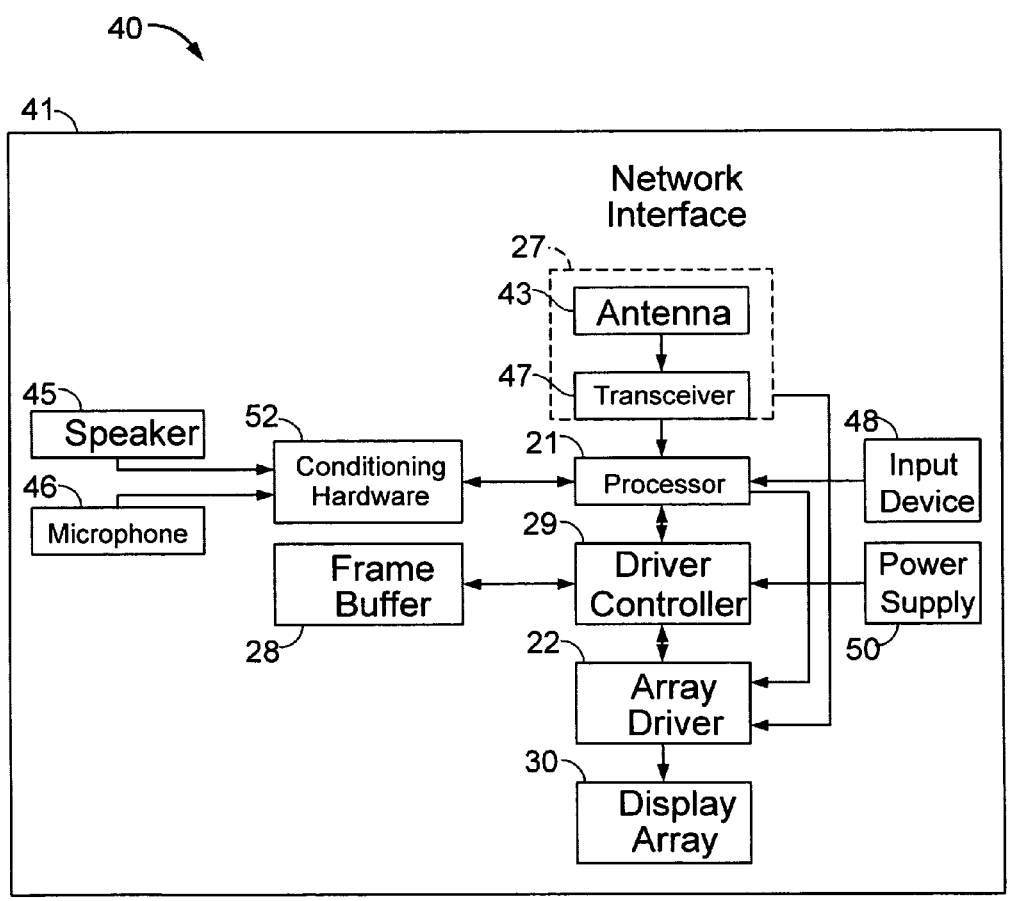

FIGS. 14A-14B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 14B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel—cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 15A:
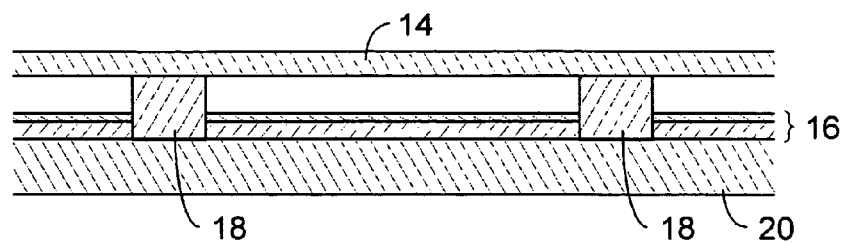
FIG. 15A is a cross section of an interferometric modulator of FIG. 9.
Figure 15B:
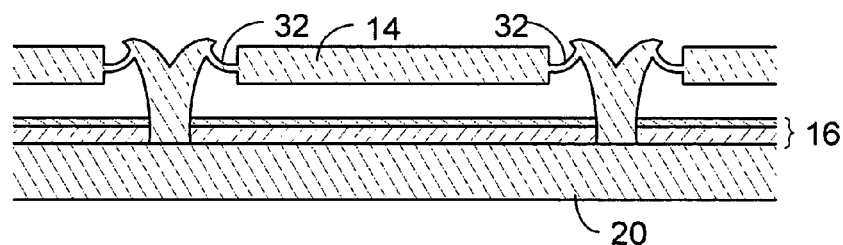
FIGS. 15B-15E are alternative embodiments of an interferometric modulator.
Figure 15C:
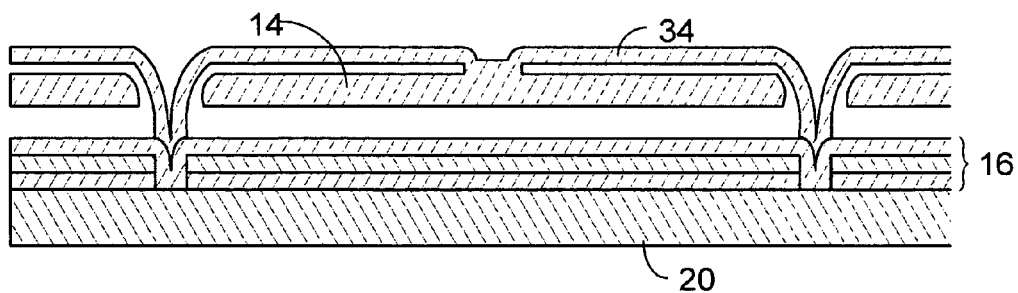
Figure 15D:
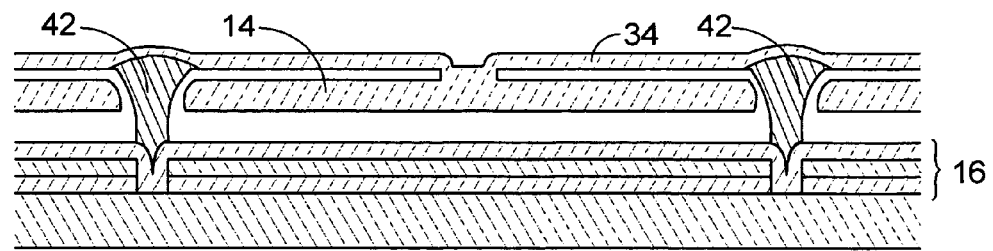
Figure 15E:
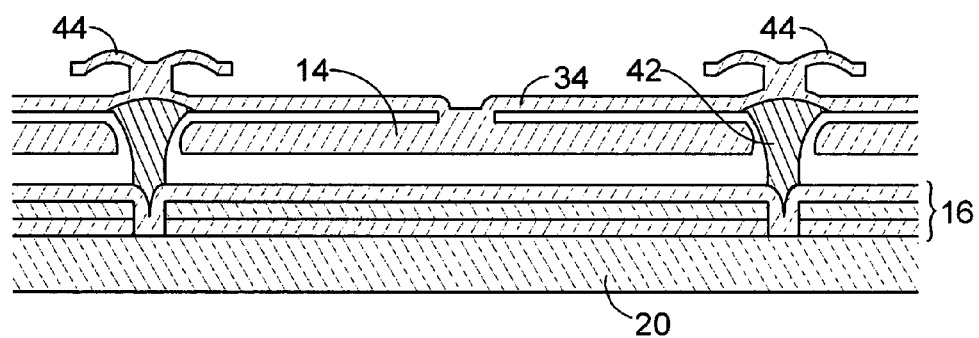

The details of the structure of interferometric modulators that operate in accordance with the principles set forth above may vary widely. For example, FIGS. 15A-15E illustrate five different embodiments of the movable reflective layer 14 and its supporting structures. FIG. 15A is a cross section of the embodiment of FIG. 9, where a strip of metal material 14 is deposited on orthogonally extending supports 18. In FIG. 15B, the moveable reflective layer 14 is attached to supports at the corners only, on tethers 32. In FIG. 15C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 15D has support post plugs 42 upon which the deformable layer 34 rests. The movable reflective layer 14 remains suspended over the gap, as in FIGS. 15A-15C, but the deformable layer 34 does not form the support posts by filling holes between the deformable layer 34 and the optical stack 16. Rather, the support posts are formed of a planarization material, which is used to form support post plugs 42. The embodiment illustrated in FIG. 15E is based on the embodiment shown in FIG. 15D, but may also be adapted to work with any of the embodiments illustrated in FIGS. 15A-15C as well as additional embodiments not shown. In the embodiment shown in FIG. 15E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIGS. 15A-15E, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 15E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 15C-15E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Various implementations of a front lighting system for a display device have been described. Nevertheless, one or ordinary skill in the art will readily recognize that there that various modifications may be made to the implementations, and any variation would be within the spirit and scope of the present invention. For example, the techniques discussed above to implement a front lighting system can also be used to implement a back lighting system. In general, a back lighting system can be implemented with less technical restrictions relative to a front lighting system. For example, a light guide plate associated with a back lighting system can be painted with a pattern of white dots to scatter light. The pattern of white dots generally obscures light from passing through the light guide plate and, therefore, such a technique would not be used in a front lighting system. Other suitable techniques, e.g., use of films, for scattering light can be implemented in a back lighting system.

What is claimed is:

1. An illuminator for a display comprising:
   a light guide plate to substantially cover a viewable portion of the display;
   a thin-film light-emitting source; and
   an optical component comprising a first narrow portion, a second wide portion and a third narrow portion, the second wide portion interposed between the first narrow portion and the third narrow portion, said first narrow portion, said second wide portion, and said third narrow portions being curved, said light-emitting source having one dimension that is substantially the same as the thickness of the light guide plate,
   wherein the light-emitting source is disposed with respect to the first narrow portion such that the optical component admits light from the light-emitting source which is directed into the light guide plate via the optical component to provide light for the viewable portion of the display.

2. The illuminator of claim 1, wherein the light-emitting source is bonded directly to the optical component.

3. The illuminator of claim 1, wherein the light-emitting source comprises an organic light-emitting diode (OLED).

4. The illuminator of claim 1, wherein the light-emitting source comprises an electroluminescent (EL) thin film light source.

5. The illuminator of claim 3, wherein the organic light-emitting diode (OLED) consists of a single pixel.

6. The illuminator of claim 5, wherein a first dimension of the pixel is substantially equal to a thickness of the light guide plate and a second dimension of the pixel is substantially equal to a length of the edge of the light guide plate.

7. The illuminator of claim 5, wherein the pixel comprises a white pixel.

8. The illuminator of claim 7, wherein the white pixel is created by a plurality of separate wavelength emissions that are matched to a plurality of specific reflectivities of subpixels that make up each pixel of a color display.

9. The illuminator of claim 5, wherein the pixel comprises a pixel having emissions substantially centered around a specific wavelength matched to a specific reflectivity of a monochrome display.

10. The illuminator of claim 5, the pixel having emissions substantially peaking around two specific wavelengths that are matched to a reflectivity of a bichrome display.

11. The illuminator of claim 3, wherein the optical component collimates light from the organic light-emitting diode (OLED) into the edge of the light guide plate.

12. The illuminator of claim 11, wherein at least a portion of the optical component has a substantially parabolic or elliptical shape for collimating the light from the organic light-emitting diode (OLED) into the edge of the light guide plate.

13. The illuminator of claim 12, wherein the optical component is molded directly into the light guide plate.

14. The illuminator of claim 1, wherein a thickness of the light guide plate is tapered along one edge of the light guide plate.

15. The illuminator of claim 1, wherein the illuminator is implemented within a front lighting system or a back lighting system of a display.

16. A display device comprising the illuminator of claim 1.

17. The display device of claim 16, wherein the display device comprises an interferometric modulator display.

18. The display device of claim 17, further comprising:
   a processor that is in electrical communication with the interferometric modulator display, the processor being configured to process image data; and
   a memory device in electrical communication with the processor.

19. The display device of claim 18, further comprising:
   a first controller configured to send at least one signal to the interferometric modulator display; and
   a second controller configured to send at least a portion of the image data to the first controller.

20. The display device of claim 18, further comprising an image source module configured to send the image data to the processor.

21. The display device of claim 20, wherein the image source module comprises at least one of a receiver, transceiver, and transmitter.

22. The display device of claim 18, further comprising an input device configured to receive input data and to communicate the input data to the processor.

23. An illuminator for a display comprising:
   a means for guiding light substantially covering a viewable portion of the display;
   a means for emitting light comprising a thin-film light-emitting source; and
   a means for coupling light comprising a first narrow portion, a second wide portion and a third narrow portion, the second wide portion interposed between the first narrow portion and the third narrow portion, said light-emitting means having one dimension that is substantially the same as the thickness of the light guiding means,
   wherein the light emitting means is disposed with respect to the first narrow portion such that the coupling means receives light from the light emitting means, and wherein said light emitting means is optically coupled to said light guiding means via the light coupling means such that light from the light-emitting means is directed into the light guiding means for providing light to the viewable portion of the display, said light coupling means substantially collimating the light directed into the light guiding means.

24. The illuminator of claim 23, wherein the light-emitting means is bonded directly to the light coupling means.

25. The illuminator of claim 23, wherein the light-emitting means comprises an organic light-emitting diode or an electroluminescent (EL) light-emitter.

26. The illuminator of claim 25, wherein the organic light-emitting diode consists of a single pixel.

27. The illuminator of claim 26, wherein a first dimension of the pixel is substantially equal to a thickness of the light guiding means and a second dimension of the pixel is substantially equal to a length of an edge of the light guiding means.

28. The illuminator of claim 26, wherein the pixel comprises a white pixel.

29. The illuminator of claim 25, wherein the light coupling means collimates light from the organic light-emitting diode into the edge of the light guiding means.

30. The illuminator of claim 29, wherein at least a portion of the light coupling means has a substantially parabolic or elliptical shape for collimating the light from the organic light-emitting diode into the edge of the light guiding means.

31. The illuminator of claim 30, wherein the light coupling means is molded directly into the light guiding means.

32. The illuminator of claim 23, wherein a thickness of the light guiding means is tapered along one edge of the light guiding means.

33. The illuminator of claim 23, wherein the light guiding means comprises a light guide or the light coupling means comprises an optical component.

34. The illuminator of claim 33, wherein the optical component comprises an angle-matching component.

35. The illuminator of claim 23, wherein the light guiding means comprises a light guide plate or the light emitting means comprises a light-emitting source or the light coupling means comprises an optical component.

36. A display device comprising the illuminator of claim 23, further comprising a means for modulating light, said light modulating means comprising an array of interferometric modulators that receive light from the light guiding means.

37. A method of manufacturing an illuminator for a display, the method comprising:
 providing a light guide plate having first and second surfaces and a plurality of edges, said first and second surfaces substantially covering a viewable portion of the display;
 providing an optical component comprising a first narrow portion, a second wide portion and a third narrow portion, the second wide portion interposed between the first narrow portion and the third narrow portion;
 coupling the optical component to the light guide plate; and
 optically coupling an optical output surface of a thin-film light-emitting source to the first narrow portion of the optical component such that light from the light-emitting source is directed into the light guide plate via the optical component to provide light to the viewable portion of the display, said optical output surface of the light-emitting source being substantially perpendicular to said first surface of the light guide, wherein said thin-film light-emitting source has one dimension that is substantially the same as the thickness of the light guide plate.

38. The method of claim 37, wherein the light-emitting source comprises an organic light-emitting diode (OLED).

39. The method of claim 37, wherein coupling a light-emitting source to the optical component comprises bonding the light-emitting source directly to the optical component.

40. A method of manufacturing a display device comprising the method of claim 37, further comprising disposing the light guide plate with respect to a plurality of interferometric modulators to illuminate said interferometric modulators.

41. The method of manufacturing of claim 37, wherein the surface area of each of the first and second surfaces is greater than the surface area of each of the plurality of edges.

42. The method of manufacturing of claim 37, wherein the first surface is closer than said second surface to the display.

43. The method of manufacturing of claims 42, wherein the second surface is closer than said first surface to a viewer disposed to view said viewable portion of said display.

* * * * *

UNITED STATES PATENT AND TRADEMARK OFFICE
CERTIFICATE OF CORRECTION

PATENT NO. : 7,766,498 B2  Page 1 of 1
APPLICATION NO. : 11/472879
DATED : August 3, 2010
INVENTOR(S) : Jeffery B. Sampsell It is certified that error appears in the above-identified patent and that said Letters Patent is hereby corrected as shown below:

Title Page;

| Column | Line | Description of Error |
|---|---|---|
| Page 1 (Item 56) Col. 2 | 14 | Under Other Publications, change "Quanum" to --Quantum--. |
| (Item 56) Page 4 Col. 2 | 44 | Under Other Publications, change "Rosonator" to --Resonator--. |
| 3 | 42 | Change "colurn" to --column--. |
| 10 | 53 | Change "ore" to --or--. |

Signed and Sealed this
Eighteenth Day of January, 2011

David J. Kappos
*Director of the United States Patent and Trademark Office*